(12) United States Patent
Zerbini et al.

(10) Patent No.: US 8,620,498 B2
(45) Date of Patent: Dec. 31, 2013

(54) HYBRID ROAD GRADE DETERMINATION SYSTEM

(75) Inventors: Mark A. Zerbini, Canton, MI (US); Goro Tamai, West Bloomfield, MI (US)

(73) Assignee: GM Global Technology Operations LLC

( * ) Notice: Subject to any disclaimer, the term of this patent is extended or adjusted under 35 U.S.C. 154(b) by 1861 days.

(21) Appl. No.: 11/553,093

(22) Filed: Oct. 26, 2006

(65) Prior Publication Data

US 2007/0293994 A1 Dec. 20, 2007

Related U.S. Application Data

(60) Provisional application No. 60/815,151, filed on Jun. 20, 2006.

(51) Int. Cl.
*B60W 10/00* (2006.01)

(52) U.S. Cl.
USPC ........... 701/22; 701/36; 701/48; 701/51; 701/53; 701/54; 701/65; 701/70; 701/91; 701/93; 701/94; 701/95; 701/99; 180/170; 180/65.265; 180/65.28; 180/337; 180/338

(58) Field of Classification Search
None
See application file for complete search history.

(56) References Cited

U.S. PATENT DOCUMENTS

| | | | |
|---|---|---|---|
| 5,253,929 A * | 10/1993 | Ohori | 303/3 |
| 5,752,214 A * | 5/1998 | Minowa et al. | 701/111 |
| 6,059,064 A * | 5/2000 | Nagano et al. | 180/243 |
| 6,177,773 B1 | 1/2001 | Nakano et al. | 318/376 |
| 6,253,144 B1 * | 6/2001 | Yamamura et al. | 701/96 |
| 6,262,491 B1 * | 7/2001 | Kitajima et al. | 290/40 C |
| 6,269,296 B1 * | 7/2001 | Toukura et al. | 701/80 |
| 6,307,277 B1 * | 10/2001 | Tamai et al. | 290/40 C |
| 6,346,064 B1 * | 2/2002 | Hada et al. | 477/171 |
| 6,401,012 B1 * | 6/2002 | Aoki et al. | 701/1 |
| 6,405,120 B1 * | 6/2002 | Higashimata et al. | 701/96 |
| 6,625,535 B2 * | 9/2003 | Han et al. | 701/65 |
| 7,021,410 B2 * | 4/2006 | Hughes | 180/65.25 |
| 2002/0007974 A1 * | 1/2002 | Nagano et al. | 180/65.2 |
| 2002/0056584 A1 * | 5/2002 | Nakasako et al. | 180/248 |
| 2002/0065170 A1 * | 5/2002 | Suzuki | 477/171 |
| 2003/0184152 A1 * | 10/2003 | Cikanek et al. | 303/152 |
| 2003/0216850 A1 * | 11/2003 | Trefzer et al. | 701/82 |
| 2004/0034460 A1 * | 2/2004 | Folkerts et al. | 701/54 |
| 2004/0099459 A1 * | 5/2004 | Nakasako et al. | 180/248 |
| 2005/0017580 A1 * | 1/2005 | Cikanek et al. | 303/191 |
| 2005/0038576 A1 * | 2/2005 | Hara et al. | 701/22 |
| 2005/0057090 A1 * | 3/2005 | Kinser et al. | 303/112 |
| 2005/0228554 A1 * | 10/2005 | Yamamoto et al. | 701/22 |
| 2005/0256631 A1 | 11/2005 | Cawthorne et al. | 701/99 |
| 2006/0048982 A1 * | 3/2006 | Yamamoto et al. | 180/65.2 |
| 2006/0111823 A1 * | 5/2006 | Tamai | 701/38 |
| 2006/0170284 A1 * | 8/2006 | Alvarez et al. | 303/191 |
| 2006/0185914 A1 * | 8/2006 | Hommi | 180/65.1 |
| 2006/0287798 A1 * | 12/2006 | Inoue et al. | 701/70 |
| 2006/0293841 A1 * | 12/2006 | Hrovat et al. | 701/205 |
| 2007/0073466 A1 * | 3/2007 | Tamai et al. | 701/70 |
| 2007/0191181 A1 * | 8/2007 | Burns | 477/40 |

* cited by examiner

*Primary Examiner* — Jonathan M Dager

(57) ABSTRACT

A method of regulating operation of a hybrid vehicle traveling on a surface having a grade includes determining a drive force of the hybrid vehicle, calculating a brake pressure value and determining whether a grade freeze condition exists based on the brake pressure value. The method further includes calculating a grade value of the surface based on the drive force when the freeze condition does not exist and regulating operation of the hybrid vehicle based on the grade value.

18 Claims, 4 Drawing Sheets

HYBRID ROAD GRADE DETERMINATION SYSTEM

CROSS-REFERENCE TO RELATED APPLICATION

This application claims the benefit of U.S. Provisional application No. 60/815,151, filed on Jun. 20, 2006. The disclosure of the above application is incorporated herein by reference.

FIELD OF THE INVENTION

The present invention relates to hybrid vehicles, and more particularly to a system for determining a grade angle of a road that a hybrid vehicle is traveling on.

BACKGROUND OF THE INVENTION

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

During hybrid vehicle operation, the hybrid vehicle travels on various degrees of road grade, which is the road angle relative to horizontal. The degree of the road grade often influences driving behavior and vehicle operating parameters. Furthermore, it is desirable to be able to regulate certain vehicle operating conditions based on the road grade.

SUMMARY OF THE INVENTION

Accordingly, the present invention provides a method of regulating operation of a hybrid vehicle traveling on a surface having a grade. The method includes determining a drive force of the hybrid vehicle, calculating a brake pressure value and determining whether a grade freeze condition exists based on the brake pressure value. The method further includes calculating a grade value of the surface based on the drive force when the freeze condition does not exist and regulating operation of the hybrid vehicle based on the grade value.

In other features, the method further includes holding the grade value equal to a previous grade value when the freeze condition exits. Operation of the hybrid vehicle is regulated based on the grade value upon expiration of a predetermined time period after the freeze condition transitions from existing to not existing.

In another feature, the method further includes indicating a brake on status when the brake pressure value exceeds a threshold value. The grade freeze condition exists when the brake on status is indicated.

In another feature, the method further includes calculating a chassis braking force based on the brake pressure value and a vehicle speed. The grade value is further determined based on the chassis braking force.

In another feature, the method further includes calculating the grade value as a tangent of a cosine of a quotient of a grade force and a product of a hybrid vehicle mass and a gravitational constant.

In still another feature, the method further includes filtering the grade value.

In yet other features, the method further includes monitoring a plurality of grade freeze conditions and indicating that the freeze condition does not exist when one of the plurality of freeze conditions is not true. The plurality of freeze conditions include at least one of a brake on condition, a shift in progress condition, a time since a gear shift being less than a respective threshold time condition a time since a range shift being less than a respective threshold time condition, a reduced vehicle speed condition, a time since a wheel slip was detected being less than a respective threshold time condition, a rate of throttle change condition, a time since a throttle change being less than a respective threshold time condition, a rate of braking change condition, a time since a braking change being less than a respective threshold time condition and a time since a fuel off event being less than a respective threshold time condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
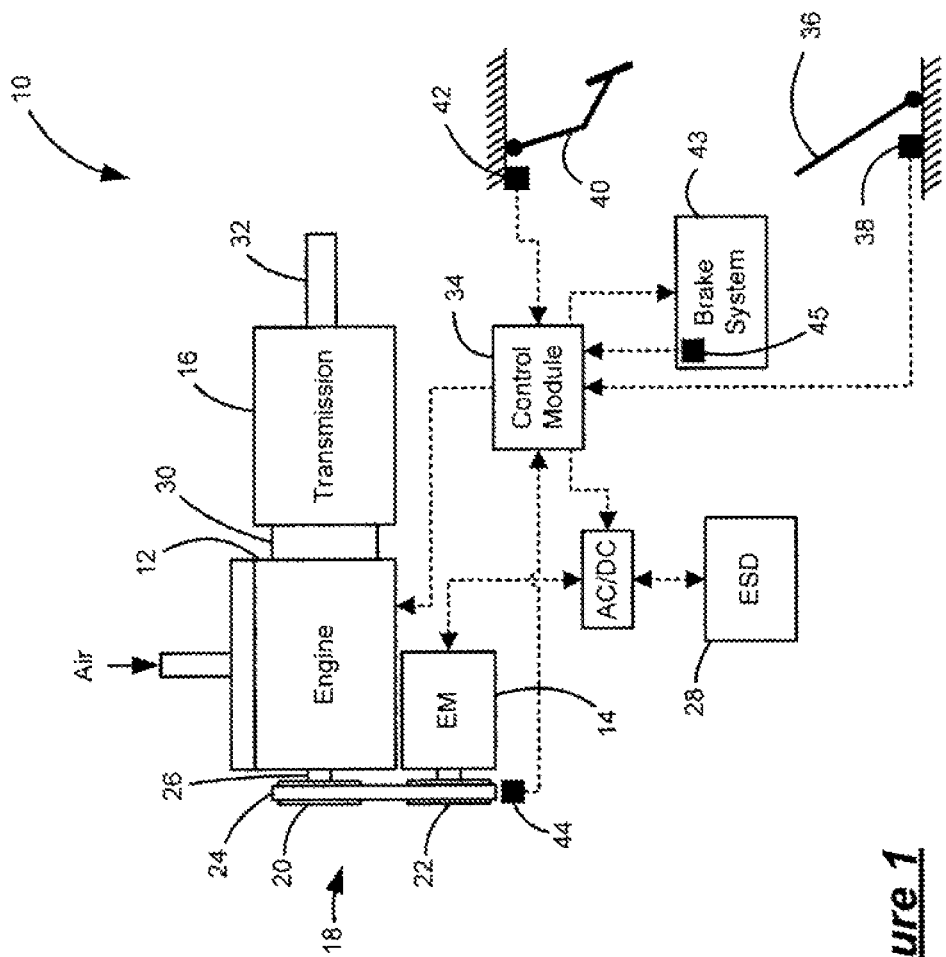
FIG. 1 is a functional block diagram of an exemplary hybrid vehicle that is operated based on the road grade determination control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 includes an engine 12 and an electric machine 14, which drive a transmission 16. Air is drawn into the engine 12 through a throttle 13, whose position is regulated by a throttle actuator 15. The air is mixed with fuel, and the air/fuel mixture is combusted within cylinders (not shown) to generate drive torque. The electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle, the engine cylinders do not fire and the valves can be deactivated. Drive torque is provided by the electric machine 14. When deactivated, fuel and spark are cut-off to the cylinders of the engine 12. Further, opening and closing cycles of the intake and exhaust valves can be prevented to inhibit air flow processing with the cylinders.

An accelerator pedal 36 is provided. A pedal position sensor 36 is sensitive to a position of the accelerator pedal 36 and generates a pedal position signal based thereon. A brake pedal 40 is provided, and a brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown). A brake position sensor 45 is provided in the brake system 43 and generates a brake pressure signal (BPS) corresponding to a brake fluid pressure downstream of a master cylinder (not shown).

The road grade determination control of the present invention determines the grade angle ($\theta$) of the road being traveled. The grade angle is expressed as a signed percent grade or tangent ($\theta$), wherein a 100% grade is equal to a grade angle of 45° (i.e., 100%·tan(45°)=100%). For example, a 4° grade angle is equal to a 6.99% grade (i.e., tan(4°)=0.0699; 0.0699·100%=6.99% grade). Furthermore, a positive grade corresponds to an uphill grade and a negative grade corresponds to a downhill grade.

Figure 2:
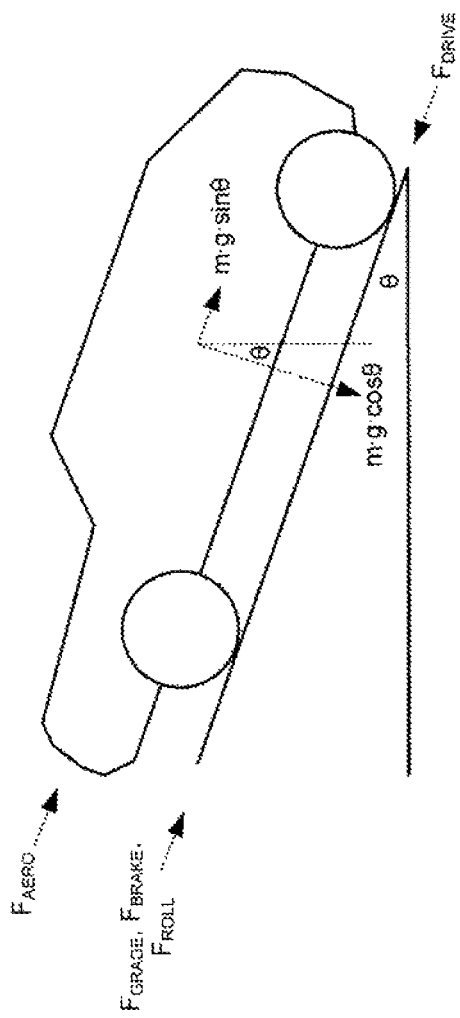
FIG. 2 is a schematic illustration of an exemplary hybrid vehicle including forces acting thereon.

Referring now to FIG. 2, exemplary forces acting on the vehicle are schematically illustrated. Accordingly, a general tractive effort equation is provided as:

$$\Sigma F = ma = F_{DRIVE} - F_{GRADE} - F_{AERO} - F_{ROLL} - F_{BRAKE}$$

$F_{DRIVE}$ is the driving force and is determined in accordance with the following relationship;

$$F_{DRIVE} = \frac{T_d}{r_{TIRE}}$$

where: $T_d$=axle torque; and
$r_{TIRE}$=tire rolling radius.
$F_{GRADE}$ is the grade force and is determine in accordance with the following relationship:

$$F_{GRADE} = mg \sin(\theta)$$

where: m=the vehicle mass (e.g., assume nominal mass); and
g=gravitational constant (i.e., 9.81 m/s$^2$).
$F_{AERO}$ is the aerodynamic force and is determined in accordance with the following relationship;

$$F_{AERO} = \frac{c_d A \rho V_{VEH}^2}{2}$$

where: $c_d$=vehicle aerodynamic drag coefficient;
A=frontal area of the vehicle;
$\rho$=air density (e.g., function of barometer pressure and air temperature); and
$V_{VEH}$=vehicle speed (kph).
$F_{ROLL}$ is the rolling resistance of the tires and is determined in accordance with the following relationship:

$$F_{ROLL} = c_r mg \cos(\theta)$$

where: $c_r$=the vehicle rolling resistance coefficient; and
$\cos \theta = 1$ for drivable road grade angles.
$F_{BRAKE}$ is the chassis braking system force and is determine as a function of the BPS. More specifically, $F_{BRAKE}$ is determined based on the following relationship:

$$F_{BRAKE} = \frac{T_{BRAKE}}{r_{TIRE}}$$

$T_{BRAKE}$ is a brake torque calibration value that is determined from a look-up table based on $V_{VEH}$ and BPS.

In the above-described relationships $\sin(\theta)$ is the only unknown. Accordingly, a real-time estimate of the road grade can be performed based on the following relationship:

$$\theta = \tan(\sin^{-1} X)$$

where: $X = F_{GRADE}/(m^*g)$
$F_{GRADE}$ is initially determined based on the following relationship:

$$F_{GRADE} = F_{DRIVE} - F_{ROLL} - F_{AERO} - F_{BRAKE} - ma$$

where: a is the vehicle acceleration.
$\theta$ is then determined in accordance with the following relationship:

$$\theta = \tan\left(\sin^{-1}\left(\frac{F_{GRADE}}{m \cdot g}\right)\right)$$

$\theta$ can be filtered to provide a filtered $\theta$ ($\theta_{FILT}$). $\theta_{FILT}$ can be determined as a running average of $\theta$ based on the following relationship:

$$\theta_{FILT} = \left(\frac{\theta_1 + \theta_2 + \theta_3 + \ldots + \theta_n}{n}\right)$$

where: n is the average number of calculation loops.

The road grade determination control of the present invention monitors a plurality of conditions, described in further detail below, and selectively sets a grade force freeze flag ($FLAG_{FRZ}$) based thereon. The plurality of conditions corresponds to those conditions that will result in abrupt changes in the vehicle operating parameters that would significantly effect the determination of the road grade. If one of the conditions is true, $\theta$ is frozen at the last determined value. Once $FLAG_{FRZ}$ is set (e.g., equal to 1 indicating the $\theta$ should be frozen), an unfreeze timer ($t_{UNFRZ}$) is initiated. $FLAG_{FRZ}$ is unset (e.g., set equal to 0) upon $t_{UNFRZ}$ achieving a threshold time ($t_{THR}$). In this manner, $\theta$ remains frozen for only $t_{THR}$.

The plurality of conditions include, but are not limited to, whether the brake is on, whether a shift is in progress, the time since a gear shift, the time since a range shift, $V_{VEH}$, the time since a wheel slip was detected, a positive/negative rate of throttle change, a time since the positive/negative rate of throttle change, a positive/negative rate of braking change, a time since the positive/negative rate of braking change, and a time since a fuel off event. $FLAG_{FRZ}$ is set if the brake pressure is greater than a threshold brake pressure, if a gear shift is in progress, if the time since the last gear shift is less than a threshold time, if the time since a range change (e.g., change between one of Park (P), Neutral (N), Reverse (R) and Drive (D)), if $V_{VEH}$ is less than a threshold $V_{VEH}$ ($V_{THR}$) or if the time since a wheel slip, which can be monitored using traditionally provided ABS sensors, is less than a respective threshold time. The throttle position is also monitored and $FLAG_{FRZ}$ is set if a positive or negative rate of change of the throttle position is greater than a respective threshold. $FLAG_{FRZ}$ is also set if the time since the positive or negative rate of change exceeded its respective threshold exceeds a respective threshold time. Finally, $FLAG_{FRZ}$ is set is the time since a fuel off event (e.g., transitioning into a hybrid engine off (HEOff mode) is less than a respective threshold time.

The control module 34 regulates operation of the vehicle based on the road grade. For example, if the road grade exceeds a threshold road grade, the control module 34 will not turn off the engine 12 and enter the HEOff mode, even if the other vehicle operating parameters indicate that the HEOff mode is appropriate. In this manner, the engine 12 remains active on steep road grades. Alternatively, the control module 34 can selectively activate hill-hold devices (e.g., the brakes, redundant transmission clutches and/or a parking pawl) based on the road grade value. Furthermore, the control module 34 can regulate the gear ratio of the transmission 16 based on the road grade value. For example, for steeper downhill road grades, a lower gear ratio is selected, particularly if the vehicle is being operated in a cruise control mode. Also, the idle speed of the engine 12 can be adjusted based on the road grade to inhibit vehicle rollback. For example, the engine idle speed can be proportional to the road grade.

Figure 3:
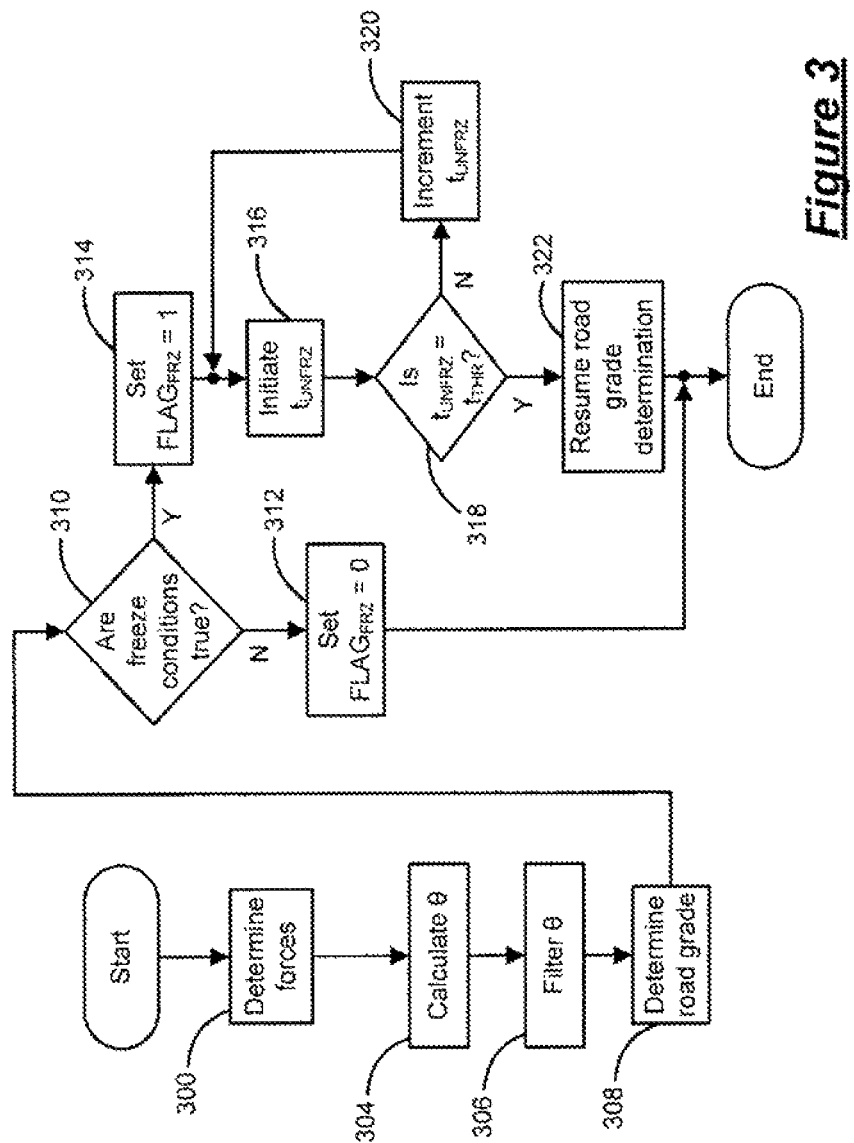
FIG. 3 is a flowchart illustrating exemplary steps executed by the road grade determination control of the present invention.

Referring now to FIG. 3, exemplary steps executed by the road grade determination control will be described in detail. In step 300, control determines the forces (e.g., $F_{DRIVE}$, $F_{ROLL}$, $F_{GRADE}$, $F_{AERO}$ and $F_{BRAKE}$) as discussed in detail above. In step 304, control calculates $\theta$ based on the forces. Control filters $\theta$ in step 306 and determines the road grade in step 308.

In step 310, control determines whether any of the freeze conditions is true. If none of the freeze conditions is true, control sets $FLAG_{FRZ}$ equal to 0 in step 312, and control ends. If one or more of the freeze conditions is true, control sets $FLAG_{FRZ}$ equal to 1 in step 314. In step 316, control initiates $t_{UNFRZ}$. Control determines whether $t_{UNFRZ}$ is equal to $t_{THR}$ in step 318. If $t_{UNFRZ}$ is not equal to $t_{THR}$, control increment $t_{UNFRZ}$ in step 320 and loops back to step 318. If $t_{UNFRZ}$ is equal to $t_{THR}$, control resumes road grade determination in step 322 and control ends.

Figure 4:
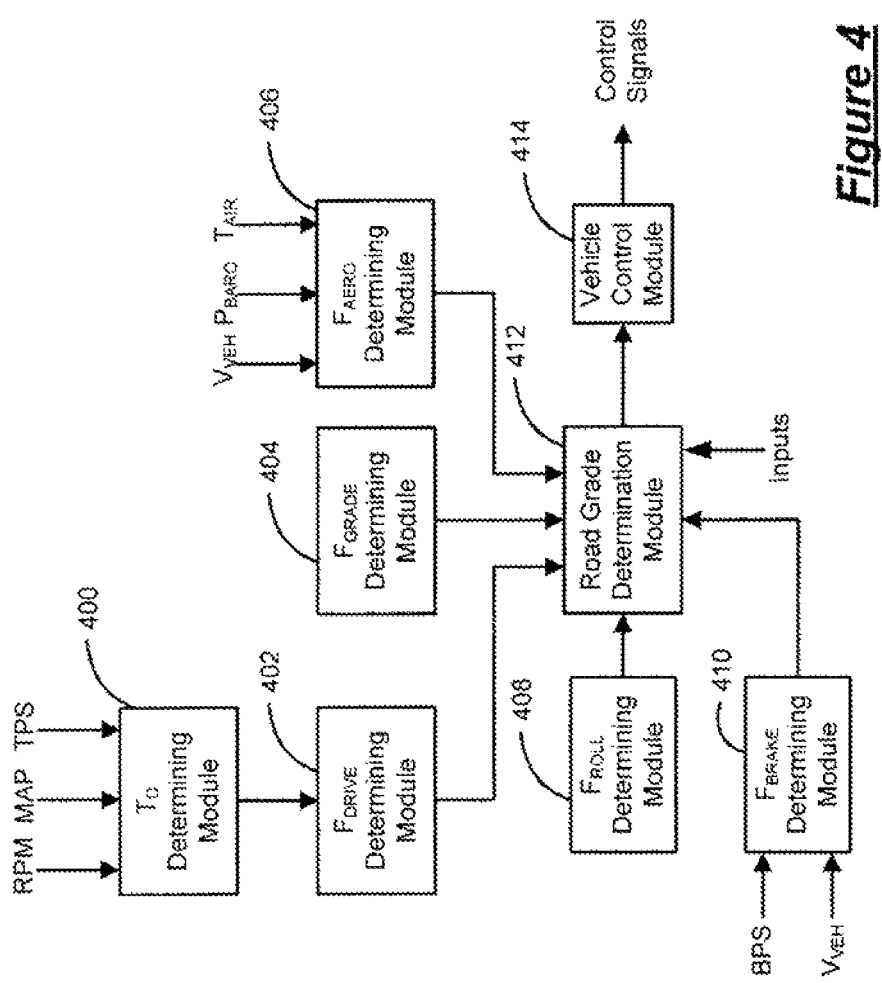
FIG. 4 is a functional block diagram of exemplary modules that execute the road grade determination control of the present invention.

Referring now to FIG. 4, exemplary modules that execute the road grade determination control will be described in detail. The exemplary module include a $T_d$ determining module 400, an $F_{DRIVE}$ determining module 402, an $F_{GRADE}$ determining module 404, $F_{AERO}$ determining module 406, an $F_{ROLL}$ determining module 408, an $F_{BRAKE}$ determining module 410, a road grade determining module 412 and a vehicle control module 414.

The $T_d$ determining module 400 determines $T_d$ based on engine operating parameters including, but not limited to, RPM, MAP and TPS. The $F_{DRIVE}$ determining module 402 determines $F_{DRIVE}$ based on $T_d$ and other vehicle parameters (e.g., $r_{TIRE}$). Such vehicle parameters can be stored in memory, or can be determined. In the case of $r_{TIRE}$, for example, $r_{TIRE}$ can be determined using a tire pressure sensing routine, for example. The $F_{GRADE}$ and $F_{ROLL}$ determining modules 404, 408 determine $F_{GRADE}$ and $F_{ROLL}$, respectively, as described above.

The $F_{AERO}$ determining module 406 determines $F_{AERO}$ based on vehicle operating parameters and environmental parameters including, but not limited to, $V_{VEH}$, a barometric pressure ($P_{BARO}$) and an air temperature ($T_{AIR}$). The $F_{BRAKE}$ determining module 410 determine $F_{BRAKE}$ based on BSP and $V_{VEH}$. The road grade determining module 412 determines the road grade based on the various forces, as described in detail above. The road grade determining module 412 also monitors various inputs (e.g., BPS, TPS, $V_{VEH}$, shift status, fuel off and the like) that correspond to the road grade freeze conditions. The vehicle control module 414 regulates operation of the vehicle based on the road grade.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A grade determination system for a hybrid vehicle that travels on a surface, comprising:
   a first module that determines a net force on said hybrid vehicle;
   a second module that calculates a grade value of said surface based on said net force; and
   a third module that, based on said grade value, at least one of maintains a lower gear when said hybrid vehicle is in cruise control and adjusts an idle speed of an engine of said hybrid vehicle.

2. The grade determination system of claim 1 wherein said second module holds said grade value equal to a previous grade value when one or more of a plurality of conditions are true, wherein said plurality of conditions includes a brake on condition, a shift in progress condition, a time since a gear shift being less than a respective threshold time condition, a time since a range shift being less than a respective threshold time condition, a reduced vehicle speed condition, a time since a wheel slip was detected being less than a respective threshold time condition, a rate of throttle change condition, a time since a throttle change being less than a respective threshold time condition, a rate of braking change condition, a time since a braking change being less than a respective threshold time condition and a time since a fuel off event being less than a respective threshold time condition.

3. The grade determination system of claim 2 wherein said third module, based on said grade value, at least one of maintains said lower gear when said hybrid vehicle is in cruise control and adjusts said idle speed of said engine upon expiration of a predetermined time period after said one or more of said plurality of conditions transition from true to false.

4. The grade determination system of claim 1 wherein said grade value is calculated as a tangent of a cosine of a quotient of said net force and a product of a mass of said hybrid vehicle and a gravitational constant.

5. The grade determination system of claim 1 further comprising filtering said grade value by averaging said grade value with N previous grade values, wherein N is an integer greater than or equal to one.

6. A method of regulating operation of a hybrid vehicle traveling on a surface having a grade, comprising:
determining a net force on said hybrid vehicle;
calculating a grade value of said surface based on said net force; and
based on said grade value, at least one of maintaining a lower gear when said hybrid vehicle is in cruise control and adjusting an idle speed of an engine of said hybrid vehicle.

7. The method of claim 6 further comprising holding said grade value equal to a previous grade value when one or more of a plurality of conditions are true, wherein said plurality of conditions includes a brake on condition, a shift in progress condition, a time since a gear shift being less than a respective threshold time condition, a time since a range shift being less than a respective threshold time condition, a reduced vehicle speed condition, a time since a wheel slip was detected being less than a respective threshold time condition, a rate of throttle change condition, a time since a throttle change being less than a respective threshold time condition, a rate of braking change condition, a time since a braking change being less than a respective threshold time condition and a time since a fuel off event being less than a respective threshold time condition.

8. The method of claim 7 further comprising said based on said grade value, at least one of maintaining said lower gear when said hybrid vehicle is in cruise control and adjusting said idle speed of said engine upon expiration of a predetermined time period after said one or more of said plurality of conditions transition from true to false.

9. The method of claim 6 further comprising calculating said grade value as a tangent of a cosine of a quotient of said net force and a product of a mass of said hybrid vehicle and a gravitational constant.

10. The method of claim 6 further comprising filtering said grade value by averaging said grade value with N previous grade values, wherein N is an integer greater than or equal to one.

11. The grade determination system of claim 1, wherein said net force includes a difference between a force driving said hybrid vehicle and a sum of an aerodynamic force against said hybrid vehicle, a resistive force against rolling of tires of said hybrid vehicle, a braking force against said hybrid vehicle, a mass of said hybrid vehicle, and an acceleration of said hybrid vehicle.

12. The grade determination system of claim 11, wherein said force driving said hybrid vehicle is based on axle torque and radii of tires of said hybrid vehicle, wherein said aerodynamic force is based on air temperature, air pressure, and a speed of said hybrid vehicle, and wherein said resistive force is based on a rolling resistance of said tires, said mass of said hybrid vehicle, and a gravitational constant.

13. The grade determination system of claim 12, wherein said braking force is based on a pressure of brake fluid downstream from a master brake cylinder, said speed of said hybrid vehicle, and said rolling resistance of said tires.

14. The grade determination system of claim 1, wherein said third module at least one of prevents said engine of said hybrid vehicle from stopping when said grade value is greater than a first threshold, actuates vehicle hill holding devices when said grade value is greater than a second threshold, maintains said lower gear when said hybrid vehicle is in cruise control and said grade value is less than a third threshold, and adjusts said idle speed of said engine to prevent said hybrid vehicle from rolling backwards when said grade value is less than a fourth threshold, wherein said first, second, and fourth thresholds are greater than zero, and wherein said third threshold is less than zero.

15. The method of claim 6, wherein said net force includes a difference between a force driving said hybrid vehicle and a sum of an aerodynamic force against said hybrid vehicle, a resistive force against rolling of tires of said hybrid vehicle, a braking force against said hybrid vehicle, a mass of said hybrid vehicle, and an acceleration of said hybrid vehicle.

16. The method of claim 15, further comprising:
determining said force driving said hybrid vehicle based on axle torque and radii of tires of said hybrid vehicle;
determining said aerodynamic force based on air temperature, air pressure, and a speed of said hybrid vehicle; and
determining said resistive force based on a rolling resistance of said tires, said mass of said hybrid vehicle, and a gravitational constant.

17. The method of claim 16, further comprising:
determining said braking force based on a pressure of brake fluid downstream from a master brake cylinder, said speed of said hybrid vehicle, and said rolling resistance of said tires.

18. The method of claim 6, further comprising at least one of:
preventing said engine of said hybrid vehicle from stopping when said grade value is greater than a first threshold;
actuating vehicle hill holding devices when said grade value is greater than a second threshold;
maintaining said lower gear when said hybrid vehicle is in cruise control and said grade value is less than a third threshold; and
adjusting said idle speed of said engine to prevent said hybrid vehicle from rolling backwards when said grade value is less than a fourth threshold,
wherein said first, second, and fourth thresholds are greater than zero, and wherein said third threshold is less than zero.

* * * * *